United States Patent
Davidson et al.

(10) Patent No.: US 9,387,550 B2
(45) Date of Patent: Jul. 12, 2016

(54) WAVEFORM COMPENSATION SYSTEMS AND METHODS FOR SECONDARY WELD COMPONENT RESPONSE

(75) Inventors: Robert R. Davidson, New London, WI (US); Thomas A. Bunker, Black Creek, WI (US); Richard Schuh, Freedom, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 219 days.

(21) Appl. No.: 13/619,499

(22) Filed: Sep. 14, 2012

(65) Prior Publication Data

US 2014/0076871 A1  Mar. 20, 2014

(51) Int. Cl.
  B23K 9/09    (2006.01)
  B23K 9/095   (2006.01)
  B23K 9/10    (2006.01)
  B23K 9/173   (2006.01)

(52) U.S. Cl.
  CPC ............ B23K 9/0956 (2013.01); B23K 9/1043 (2013.01); B23K 9/173 (2013.01)

(58) Field of Classification Search
  CPC .................................................. B23K 9/095
  USPC ............... 219/124.03, 124.1, 130.01, 130.21, 219/130.31, 130.33, 130.51, 137 PS
  See application file for complete search history.

(56) References Cited

U.S. PATENT DOCUMENTS

| 5,315,089 A | 5/1994 | Hughes et al. |
| 5,756,967 A | 5/1998 | Quinn et al. |
| 5,968,587 A * | 10/1999 | Frankel .............................. 427/8 |
| 6,248,976 B1 | 6/2001 | Blankenship |
| 6,265,688 B1 | 7/2001 | Lyshkow |
| 6,359,258 B1 | 3/2002 | Blankenship et al. |
| 6,596,970 B2 | 7/2003 | Blankenship et al. |
| 6,710,297 B1 | 3/2004 | Artelsmair et al. |
| 6,906,284 B2 | 6/2005 | Kim et al. |
| 7,244,905 B2 | 7/2007 | Das et al. |
| 7,683,290 B2 | 3/2010 | Daniel et al. |
| 2004/0182828 A1* | 9/2004 | Schmidt et al. .................. 219/99 |
| 2008/0264916 A1 | 10/2008 | Nagano et al. |
| 2010/0133250 A1 | 6/2010 | Sardy et al. |
| 2010/0308026 A1 | 12/2010 | Vogel |
| 2010/0308027 A1* | 12/2010 | Vogel ........................ 219/130.21 |
| 2010/0314371 A1* | 12/2010 | Davidson et al. .......... 219/130.1 |

FOREIGN PATENT DOCUMENTS

| CN | 2181354 | 11/1994 |
| CN | 201098775 | 8/2008 |
| CN | 202824943 | 3/2013 |

(Continued)

OTHER PUBLICATIONS

International Search Report for PCT application No. PCT/US2013/059791 dated Mar. 11, 2014, 11 pgs.

*Primary Examiner* — Brian Jennison
(74) *Attorney, Agent, or Firm* — Fletcher Yoder P.C.

(57) ABSTRACT

A method includes receiving data corresponding to a weld waveform that is generated during a welding operation and determining, based on the received data corresponding to the weld waveform, an overshoot voltage for the welding operation that exceeds an expected voltage level. The method further includes receiving data corresponding to a measured stud voltage and calculating, based on the overshoot voltage and the measured stud voltage, a stud voltage for the welding operation. The method also includes controlling at least one parameter of the welding operation based on the stud voltage for the welding operation.

19 Claims, 4 Drawing Sheets

(56) References Cited

FOREIGN PATENT DOCUMENTS

| | | |
|---|---|---|
| JP | S6471575 | 3/1989 |
| JP | H11156542 | 6/1999 |
| JP | 2001276971 | 10/2001 |
| KR | 1020120027764 | 3/2012 |

* cited by examiner

WAVEFORM COMPENSATION SYSTEMS AND METHODS FOR SECONDARY WELD COMPONENT RESPONSE

BACKGROUND

The invention relates generally to welding systems, and, more particularly, to systems and methods for compensation of an error in a secondary component of a welding system.

Welding is a process that has become ubiquitous in various industries and applications, such as construction, ship building, and so forth. Welding systems typically include a variety of secondary components, which may include secondary cabling as well as secondary equipment. Such secondary components may include welding torches, weld fixturing, weld cables, and so forth, and certain parameters of these secondary components may impact the quality of the weld obtained in a welding operation. For example, weld cables generally have associated resistance and inductance values. Due to the high current levels associated with typical welding processes, these inductance and resistance values often lead to voltage errors. In many instances, these voltage errors may lead to a decrease in the quality of the weld because voltage is used to control parameters of the welding arc.

Some previous systems have attempted to address the foregoing problem to reduce or eliminate the likelihood of experiencing the aforementioned decrease in weld quality due to the features of the secondary cabling. For example, some systems may utilize a non-current carrying voltage sensing lead that extends from the weld power supply to the end of the weld cables. Such voltage sensing leads may be utilized to sense the voltage at the weld without being affected by the voltage error generated by the weld cables. However, many weld environments are already cluttered with a variety of cables and other structures, and the addition of an extra cable may be undesirable. Accordingly, there exists a need for improved systems and methods for the compensation of errors introduced into the weld operation by secondary components, such as weld cabling.

BRIEF DESCRIPTION

In one embodiment, a method includes receiving data corresponding to a weld waveform that is generated during a welding operation and determining, based on the received data corresponding to the weld waveform, an overshoot voltage for the welding operation that exceeds an expected voltage level. The method further includes receiving data corresponding to a measured stud voltage and calculating, based on the overshoot voltage and the measured stud voltage, a stud voltage for the welding operation. The method also includes controlling at least one parameter of the welding operation based on the stud voltage for the welding operation.

In another embodiment, a controller for a welding system is configured to receive data corresponding to a weld waveform generated during a welding operation and to determine an amount of voltage overshoot in the weld waveform for the welding operation that exceeds an expected voltage level for the welding operation. The controller is further configured to receive data corresponding to a measured stud voltage, to compute a compensated stud voltage for the welding operation based on the amount of voltage overshoot and the measured stud voltage, and to output a weld command for the welding operation corresponding to an expected weld command adjusted to account for the compensated stud voltage.

In another embodiment, a welding system includes a welding power supply, a welding torch coupled to the welding power supply via a torch cable, a fixture adapted to secure a workpiece in a welding location, and a ground cable coupled to the welding power supply and at least one of the fixture and the workpiece. The welding system also includes a controller configured to monitor a measured stud voltage, to determine an overshoot voltage for a welding operation, and to determine a compensated stud voltage based on the measured stud voltage and the overshoot voltage. The compensated stud voltage corresponds to a voltage level at the welding location reduced from the measured stud voltage due to inductance and resistance in the torch cable.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments are provided of systems and methods that may be utilized to compensate a weld voltage utilized for control of a welding operation for an error associated with a secondary weld component, such as weld cabling. For example, such systems and methods may enable identification of a secondary weld error in the form of an inductance error due to weld cabling. In some embodiments, a weld controller may be provided such that the acquired measurements and error information may be utilized to compensate for the detected weld error. For example, in some embodiments, the controller may utilize information regarding the weld cabling to determine an appropriate voltage error compensation routine for the given welding equipment and operation. These and additional features of the provided weld controllers and methods are described in more detail below.

The compensation systems and methods disclosed herein may provide a variety of distinct advantages when compared to traditional techniques. For example, the provided embodiments enable a welding arc to be compensated for a secondary response, such as the inductance and resistance of the weld cables, without the need for voltage sensing leads. That is, whereas some prior systems utilized non-current carrying leads to sense voltage at the weld location in such a way that bypasses the voltage error generated in the weld cables, presently disclosed embodiments may enable a reduction or elimination of this additional cabling. Still further, by comparing one or more weld waveforms to one or more desired weld waveforms, certain embodiments of the controllers disclosed herein may be capable of controlling the welder in an adaptive manner such that the generated weld command takes into account both the capability of the given welder as well as the secondary response associated, for example, with the weld cables.

Figure 1:
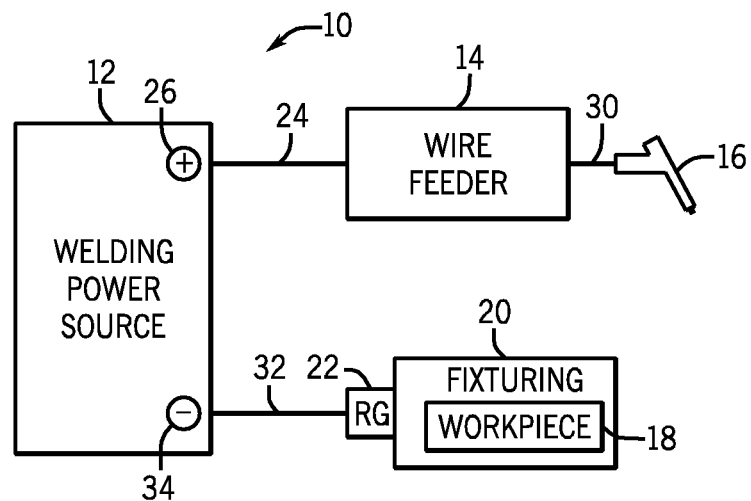
FIG. 1 is a schematic illustrating a welding system in accordance with embodiments of the present invention.

Turning now to the drawings, FIG. 1 illustrates a welding system 10 including a welding power source 12, a wire feeder 14, a welding torch 16, and a workpiece 18 positioned on fixturing 20 with rotary ground 22. In the illustrated embodiment, a positive weld lead 24 couples a positive terminal 26 of the welding power source 12 to the wire feeder 14. Further, a cable 30 couples the wire feeder to the welding torch 16. Additionally, a negative weld lead 32 couples a negative terminal 34 of the welding power source 12 to the rotary ground 22.

During operation, the welding power source 12 is configured to provide power to the welding torch 16 through the wire feeder 14, which provides wire for the welding operation. Further, during use, a welding operator utilizes the welding torch 16 to weld the workpiece 18. While welding, high current levels associated with the welding process may degrade the secondary cabling and/or equipment, and after many welding cycles, degradation of the secondary cabling and/or equipment may impact the quality of the weld. As such, certain embodiments of the present invention provide for compensation for voltage errors that may result from inductance and/or resistance errors introduced by weld secondary components, such as the weld cabling. Such voltage errors may be utilized by a weld controller to generate a weld command that compensates for the secondary response in a given welding system.

Figure 2:
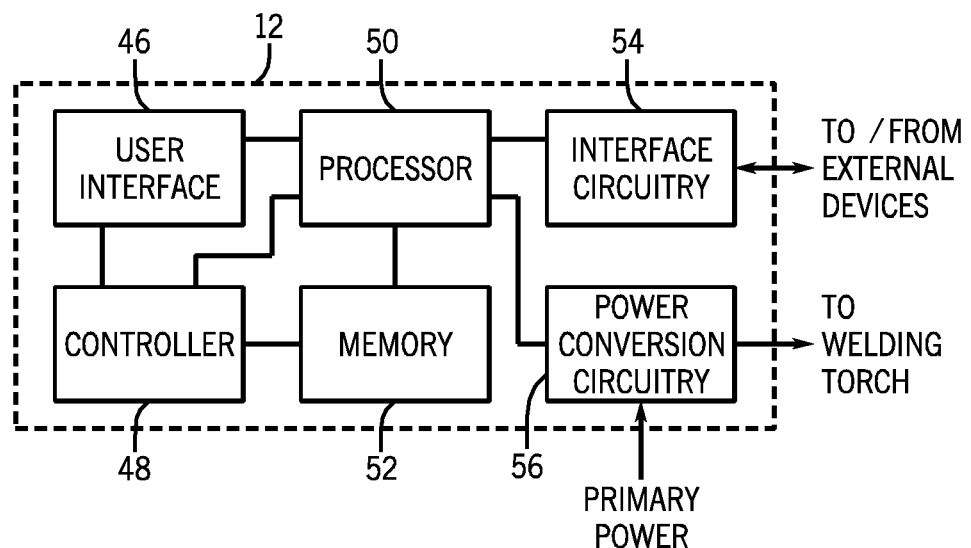
FIG. 2 is a block diagram illustrating exemplary components of the welding power source of FIG. 1 in accordance with embodiments of the present invention.

FIG. 2 illustrates example components of the welding power source 12 of FIG. 1. In the illustrated embodiment, the welding power source 12 includes a user interface 46, a controller 48, a processor 50, memory 52, interface circuitry 54, and power conversion circuitry 56. During use, the power conversion circuitry 56 receives primary power from a primary source, such as a wall outlet, a power grid, and so forth, and converts such power to an appropriate welding output for transfer to the welding torch 16. The processor 50 is configured to receive a variety of inputs regarding wire feeder operation, user choices, voltage feedback, current feedback, power feedback, resistance feedback, inductance feedback, and so forth, to process such inputs, and to generate a variety of suitable outputs that guide operation of the welding power source 12. For example, the interface circuitry 54 may receive feedback from one or more external devices (e.g., wire feeder 14, auxiliary devices, etc.), communicate such feedback to the processor 50, receive an output signal from the processor 50, and communicate such a signal to the one or more external devices.

Still further, the processor 50 may receive user inputs from the user interface 46 regarding the welding operation. For example, the processor 50 may receive commands regarding the chosen welding process, parameters of the welding process (e.g., current level, voltage level, etc.), and so forth and process such inputs. The processor 50 may also receive one or more inputs from the controller 48, which may be configured to execute one or more algorithms utilized to guide the welding process and/or any other functions of the welding power source 12. For example, in one embodiment, the controller 48 may execute a series of commands to determine the magnitude of the voltage error introduced by the secondary weld cabling and/or equipment. Acquired measurement data may then be communicated to the processor via interface circuitry 54, which may process the received information to determine, for example, an appropriate weld command that takes into account the determined voltage error introduced by the secondary weld components. In certain embodiments, if desired, such information may be communicated to the user, for example, via user interface 46. To that end, user interface 46 may be capable of communicating with the user via visual cues (e.g., light illumination, display panel message, etc.), audio cues (e.g., error message recites error), or any other suitable communication mechanism.

A variety of algorithms and control schemes, not limited to those described in detail below, may be implemented by the controller 48 of FIG. 2 to compensate for the voltage errors introduced by the secondary weld components, such as the weld cabling. For example, the controller may consider the voltage error introduced into the weld waveform while ramping up to or falling down from a local peak in a weld waveform. Indeed, in certain embodiments, the controller may consider both the ramping up portion and the falling edge portion of the weld waveform, or may consider only one desired portion of the waveform.

As described in more detail below with respect to the methods illustrated in FIGS. 6 and 7, in some embodiments, the compensation method implemented by the controller 48 includes measuring a voltage error during a ramping portion of a weld waveform. In this way, a voltage overshoot that occurs due to the secondary response may be reduced or eliminated in the feedback control signal, thereby enabling the stud voltage command to be compensated for the errors introduced by the weld secondary components. Again, it should be noted that the foregoing feature of presently disclosed embodiments may offer advantages over traditional systems that utilize voltage sensing leads to obtain the necessary data to compensate for secondary weld errors.

Figure 3:
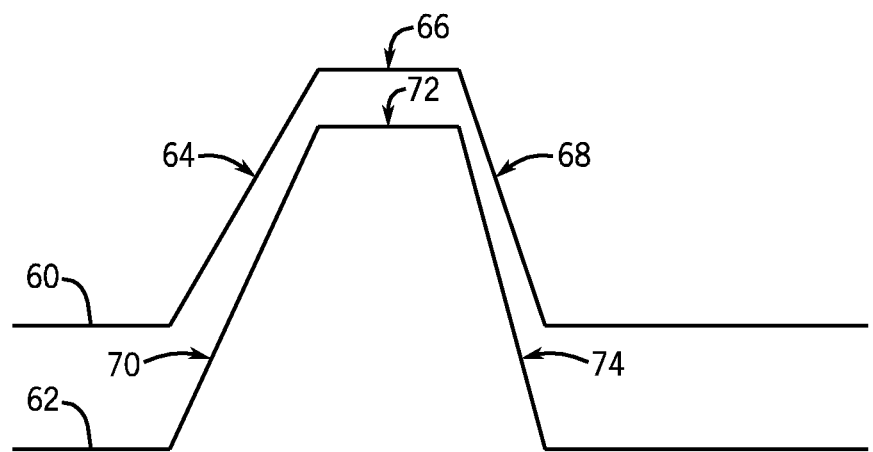
FIG. 3 is a schematic illustrating an ideal current waveform and an ideal stud voltage waveform in accordance with an embodiment of the present invention.

It should be noted that to facilitate understanding of the foregoing methods, it may be helpful to consider the stud current waveform and the stud voltage waveform that would be realized if no secondary weld errors (e.g., inductance errors) were present due to secondary components (e.g., weld cabling). Such waveforms are illustrated in FIG. 3, and these waveforms are normalized and superimposed on one another in FIG. 4. In contrast, FIG. 5 illustrates example stud voltage and current waveforms that may be obtained when secondary weld errors, such as inductance errors, are introduced by the secondary weld components, such as the weld cabling. The following description discusses such waveforms in more detail.

FIG. 3 illustrates an example stud current waveform 60 and an example stud voltage waveform 62 that may be obtained in one welding system if no inductance (or other secondary weld error) is present due to weld cabling. It should be noted that the relative shapes of the waveforms 60 and 62 are substantially similar, but the scaling and amplitude of the waveforms 60 and 62 differ due to the difference in current measurement units (e.g., amps) and stud voltage measurement units (e.g., volts). For instance, as shown, the example stud current waveform 60 includes a ramping portion 64, a peak portion 66, and a falling portion 68. Similarly, the example stud voltage waveform 62 includes a ramping portion 70, a peak portion 72, and a falling portion 74. Accordingly, if the waveforms 60 and 62 are normalized to a percentage, the waveforms 60 and 62 could be superimposed and have a background portion 76, a ramping portion 78, and a peak portion 80, as shown in FIG. 4.

Figure 4:
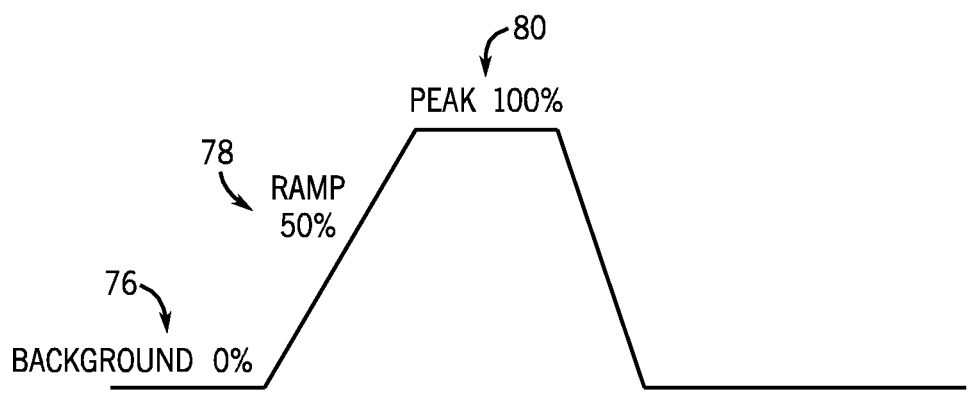
FIG. 4 is a schematic illustrating a normalized stud voltage waveform superimposed on a normalized stud current waveform in accordance with an embodiment.
Figure 5:
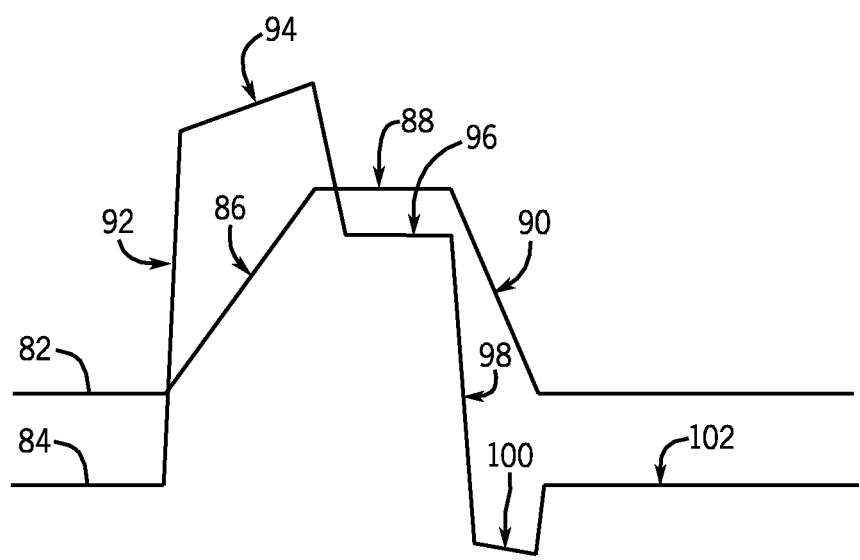
FIG. 5 is a schematic illustrating a stud current waveform and a stud voltage waveform affected by weld cable inductance in accordance with an embodiment.

While the weld waveforms in FIGS. 3 and 4 are representative of example desired waveforms obtainable without the presence of secondary weld errors, the weld waveforms associated with a given welding operation typically differ from these forms due to the presence of secondary weld errors. For example, in many instances, due to the inductance introduced by the weld cabling, the stud voltage will rise above the level in the desired waveform while ramping. An example of a normalized stud current waveform 82 and a normalized stud voltage waveform 84 for an example instance in which inductance is introduced by weld cabling is shown in FIG. 5.

As shown, the normalized stud current waveform 82 still includes a ramping portion 86, a peak portion 88, and a falling portion 90, as before. However, the normalized stud voltage waveform 84 includes a rising portion 92 and an increased portion 94 in which the voltage rises to levels beyond the peak voltage 96 before falling, as indicated by portion 98, to a level 100 before stabilization at level 102. As appreciated by those skilled in the art, the magnitude of the voltage rise is typically determined by multiplying the derivative of stud current over time by the inductance present in the weld cables.

Figure 6:
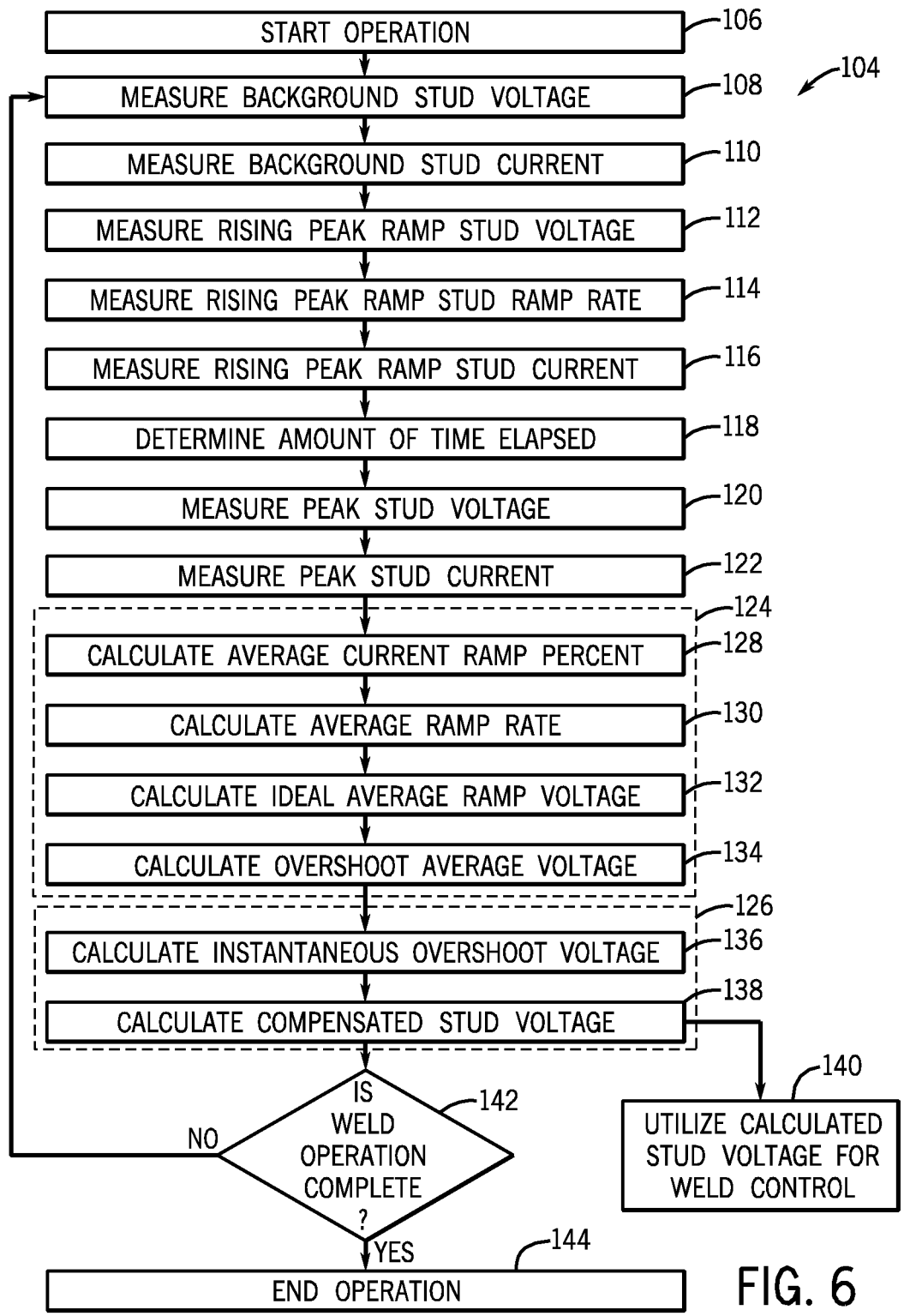
FIG. 6 is a flow chart illustrating an embodiment of a method that may be utilized by a weld controller to compensate for a voltage error introduced by weld cabling by considering a ramp portion of a weld waveform.

FIG. 6 is a flow chart illustrating an embodiment of a method 104 that may be utilized by the weld controller 48 to determine a compensated stud voltage that takes into account the secondary weld errors present in the system and to utilize the compensated stud voltage for weld control. As illustrated, the method 104 is initiated (block 106), and the background stud voltage and current are measured (blocks 108 and 110).

For example, the levels of the stud voltage and stud current during portion 76 of the waveform shown in FIG. 4 are measured. Further, additional measurements are taken that correspond to, for example, portion 78 of the waveform shown in FIG. 4. Specifically, method 104 calls for measurement of the rising peak ramp stud voltage (block 112), the rising peak ramp stud ramp rate (block 114), and the rising peak ramp stud current (block 116), as well as a determination of the time elapsed during the ramp portion of the waveform (block 118). Additionally, the method 104 includes measuring the peak stud voltage (block 120) and the peak stud current (block 122), for example, corresponding to portion 80 of the waveform shown in FIG. 4.

The method 104 also calls for performing a block 124 of steps once per waveform (e.g., approximately every 30 to 300 Hz) and a block 126 of steps each time the controller 48 loops through the control loop (e.g., approximately every 20,000 to 40,000 Hz). In the illustrated embodiment, for each waveform, the method 104 includes a calculation of the average current ramp percent (block 128). For example, in some embodiments, the following equation may be utilized to calculate the average current ramp percent:

$$\text{Current Ramp \%} = \frac{100\% * (\text{Average Ramp Current} - \text{Average Background Current})}{\text{Average Peak Current} - \text{Average Background Current}}$$

In the illustrated embodiment, for each waveform, the method 104 also includes a calculation of the average ramp rate of current (block 130). For example, in some embodiments, the following equation may be utilized to calculate the average ramp rate of current:

$$\text{Average Ramp Rate of Current} = \frac{\text{Average Peak Current} - \text{Average Background Current}}{\text{Average Ramp Time}}$$

Still further, for each waveform, the method 104 includes a calculation of the ideal (i.e., assuming no secondary weld errors are present) average ramp voltage (block 132). For example, in some embodiments, the following equation may be utilized to calculate the average ramp voltage:

Ideal Stud Ramp Voltage=[(Current Ramp %/100%)* (Average Peak Voltage−Average Background Voltage)]+Background Voltage Additionally, for each waveform, the method 104 includes a calculation of the overshoot average ramp voltage (block 134). For example, in some embodiments, the following equation may be utilized to calculate the overshoot average ramp voltage:

Overshoot Average Ramp Voltage=Measured Average Stud Ramp Voltage−Ideal Stud Ramp Voltage A block of steps 126 is also performed by the controller 48 each time the controller loops through the control loop. In the illustrated embodiment, the block 126 includes calculating an instantaneous overshoot voltage (block 136). For example, the following equation may be utilized:

$$\text{Instantaneous Overshoot Voltage} = \frac{\text{Instantaneous Ramp Rate}}{\text{Average Ramp Rate}} * \text{Overshoot Average Ramp Voltage}$$

Once the instantaneous overshoot voltage is calculated in this manner, the controller 48 may calculate a compensated stud voltage by subtracting the instantaneous overshoot voltage from the measured stud voltage (block 138). Further, the compensated stud voltage may then be utilized for weld control (block 140), thereby enabling the weld process to be corrected for one or more secondary weld errors present in the given welding system. The method 104 may proceed in this manner until upon inquiry (block 142), the controller 48 becomes aware that the weld operation is complete, and the operation is ended (block 144).

It should be noted that although the illustrated embodiment measures the voltage error present while the weld waveforms are ramping up to a peak (e.g., portion 78 of the waveform of FIG. 4), in other embodiments, the voltage error may be measured while the weld waveforms are falling down from the peak. In either embodiment, however, secondary weld errors (e.g., inductance errors due to weld cabling) may be compensated for in the weld control by determining and removing the voltage errors associated with a portion of a weld waveform from the feedback signal.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
accessing, via a processor, data corresponding to a measured stud voltage and a current of a weld waveform that is generated during a welding operation;
determining, via the processor, an overshoot voltage for the welding operation that exceeds an expected voltage level, wherein the overshoot voltage is determined based on a ramp rate of the current of the weld waveform;
calculating, via the processor, based on the overshoot voltage and the measured stud voltage, a compensated stud voltage for the welding operation; and
controlling, via the processor, welding power configured to compensate for effects of inductance based on the compensated stud voltage for the welding operation, wherein at least part of the compensation for inductance is performed without reference to a voltage measured by a voltage sensing lead.

2. The method of claim 1, wherein calculating the compensated stud voltage for the welding operation comprises subtracting, via the processor, the overshoot voltage for the welding operation from the measured stud voltage.

3. The method of claim 1, wherein determining the overshoot voltage for the welding operation comprises determining, via the processor, a quantity corresponding to an instantaneous ramp rate divided by an average ramp rate and multiplying the determined quantity by an overshoot average ramp voltage.

4. The method of claim 1, comprising determining, via the processor, a compensated weld waveform for the weld operation based on the calculated compensated stud voltage for the welding operation.

5. The method of claim 4, comprising displaying the weld waveform and the compensated weld waveform on a user interface of a welding power supply.

6. A controller for a welding system, configured to:
access data corresponding to a measured stud voltage and a current of a weld waveform generated during a welding operation;
determine an amount of voltage overshoot in the weld waveform for the welding operation that exceeds an expected voltage level for the welding operation, wherein the amount of voltage overshoot is determined based on a ramp rate of the current of the weld waveform;
compute a compensated stud voltage for the welding operation based on the amount of voltage overshoot and the measured stud voltage; and
output a weld command for the welding operation corresponding to an expected weld command adjusted to control welding power configured to compensate for effects of inductance based on the compensated stud voltage for the welding operation, wherein at least part of the compensation for the inductance is performed without reference to a voltage measured by a voltage sensing lead.

7. The controller of claim 6, wherein the controller is configured to compute the compensated stud voltage by subtracting the voltage overshoot for the welding operation from the measured stud voltage.

8. The controller of claim 6, further configured to receive one or more inputs from a user regarding at least one of a negative weld cable length, a negative weld cable size, a positive weld cable length, a positive weld cable size, or a combination thereof.

9. The controller of claim 8, further configured to utilize at least one of the negative weld cable length, the negative weld cable size, the positive weld cable length, and the positive weld cable size to determine the weld command for the welding operation.

10. The controller of claim 6, wherein the weld command for the welding operation comprises at least one of a voltage command and a current command.

11. The controller of claim 6, wherein the controller is configured to determine the amount of overshoot voltage by determining a quantity corresponding to an instantaneous ramp rate divided by an average ramp rate and multiplying the determined quantity by an overshoot average ramp voltage.

12. A welding system, comprising:
a welding power supply configured to generate a weld waveform during a welding operation;
a welding torch coupled to the welding power supply via a torch cable;
a fixture configured to secure a workpiece in a welding location;
a ground cable coupled to the welding power supply and at least one of the fixture and the workpiece; and
a controller configured to monitor a measured stud voltage and a current of the weld waveform, to determine an overshoot voltage for the welding operation, to determine a compensated stud voltage based on the measured stud voltage and the overshoot voltage, and to utilize the compensated stud voltage to control welding power configured to compensate for effects of inductance of the welding operation, wherein the overshoot voltage is determined based on a ramp rate of the current of the weld waveform, and wherein the compensated stud voltage corresponds to a voltage level at the welding location reduced from the measured stud voltage to compensate for at least part of the inductance without reference to a voltage measured by a voltage sensing lead.

13. The system of claim 12, wherein the controller is configured to compute the compensated stud voltage by subtracting the overshoot voltage from the measured stud voltage.

14. The system of claim 12, wherein the controller is configured to determine the overshoot voltage by determining a quantity corresponding to an instantaneous ramp rate divided by an average ramp rate and multiplying the determined quantity by an overshoot average ramp voltage.

15. The system of claim 12, wherein the welding power supply comprises a constant current welding power supply.

16. The system of claim 12, wherein the welding power supply comprises a metal inert gas (MIG) power supply, a tungsten inert gas (TIG) power supply, or a stick power supply.

17. The method of claim 1, wherein the ramp rate comprises an average ramp rate.

18. The controller of claim 6, wherein the ramp rate comprises an average ramp rate.

19. The system of claim 12, wherein the ramp rate comprises an average ramp rate.

* * * * *